United States Patent [19]

Tanaka et al.

[11] Patent Number: 5,618,873
[45] Date of Patent: Apr. 8, 1997

[54] SLIDING MEMBER

[75] Inventors: Tadashi Tanaka; Masaaki Sakamoto; Nobutaka Hiramatsu, all of Nagoya, Japan

[73] Assignee: Daido Metal Company Ltd., Nagoya, Japan

[21] Appl. No.: 504,745

[22] Filed: Jul. 20, 1995

[30] Foreign Application Priority Data

Aug. 4, 1994 [JP] Japan ..................................... 6-204431

[51] Int. Cl.⁶ ..................................................... C08K 3/18
[52] U.S. Cl. ........................... 524/430; 524/546; 524/502; 524/606; 524/609
[58] Field of Search ..................................... 524/430, 546, 524/502, 606, 609

[56] References Cited

U.S. PATENT DOCUMENTS 5,091,098  2/1992  Tanaka et al. .......................... 252/12.2

FOREIGN PATENT DOCUMENTS

| 60-32848 | 2/1985 | Japan . |
| 62-10166 | 1/1987 | Japan . |
| 1-242662 | 9/1989 | Japan . |
| 4-65866 | 10/1992 | Japan . |
| 2177099 | 1/1987 | United Kingdom . |

OTHER PUBLICATIONS

Japanese Abstract No. JP 1014275 A, 18 Jan. 1989.
Japanese Abstract No. JP 61261396 A, 19 Nov. 1986.
Japanese Abstract No. JP 58217549 A, 17 Dec. 1983.

*Primary Examiner*—Mark D. Sweet
*Attorney, Agent, or Firm*—Browdy and Neimark

[57] ABSTRACT

A sliding member obtained by molding a resin composition comprising an aromatic polyamide fiber, a polytetrafluoroethylene, a lead oxide and at least one other heat resistant synthetic resin, the aromatic polyamide fiber being in a proportion of 10 to 30% by volume based on the total volume of the aromatic polyamide fiber, the polytetrafluoroethylene, the lead oxide and the other heat resistant synthetic resin, the polytetrafluoroethylene being in a proportion of 5 to 20% by volume based on the total volume, and the lead oxide being in a proportion of 0.1 to less than 5% by volume based on the total volume, and provided that the total of the aromatic polyamide fiber, the polytetrafluoroethylene, the lead oxide and the other heat resistant synthetic resin equals to 100% by volume.

14 Claims, No Drawings

SLIDING MEMBER

BACKGROUND OF THE INVENTION

This invention relates to a sliding member prepared by molding a resin composition.

A resin type sliding member, for example, a plain bearing, in which a lubricating oil is not used, is obtained by molding a resin composition in which an abrasion resistant synthetic resin is compounded with a lubricant and a reinforcing material. Various inventions have been made for enhancing the sliding characteristics at high temperatures of such sliding members.

For example, JP-B 4-65,866 (Prior Art 1) discloses a molded article of a resin composition composed of 100 parts by weight of a polyphenylene sulfide, 3 to 60 parts by weight of a fluoroplastic and 3 to 60 parts by weight of an aromatic polyamide fiber. Sliding members obtained from the above resin composition are stated to have excellent sliding characteristics.

JP-A 1-242,662 (Prior Art 2) discloses a resin composition composed of 10 to 90% by weight of an aromatic polyetherketone having added thereto 5 to 60% by weight of a carbon fiber and 5 to 30% by weight of carbon powder having an average particle size of 1–200 μm. This resin composition is stated to be suitable as a material for a sliding member resistant to a high temperature and a high load.

JP-A 62-10,166 (Prior Art 3) discloses a sliding composition composed of 40 to 75% by volume of a heat resistant synthetic resin such as polyphenylene sulfide or the like, 5 to 25% by volume of an aromatic polyamide fiber, 5 to 30% by volume of a polytetrafluoroethylene (referred to hereinafter as PTFE) and 5 to 35% by volume of a lead oxide in which the volume ratio of PTFE to lead oxide is 1:0.5 to 1:1.5 and the total of the two is 15 to 55% by volume. A sliding member obtained from this resin composition is stated to have stable abrasion resistance in a high temperature zone without damaging a counter member even if the counter member is of a soft metal such as aluminum alloy or the like.

For example, a resin composition to be used in a bearing for a roller such as a heat roller or a press roller which forms a pair with the heat roller in a duplicating machine is required to have excellent sliding characteristics such as low frictional properties, abrasion resistance and the like over a range of from room temperature to a high temperature zone because the bearing is used over a range of from room temperature to a high temperature zone of about 150° C.. In addition, in the case of a shaft composed of a soft metal such as aluminum alloy, stainless steel or the like, it is also important that the bearing therefor does not damage the shaft.

However, in Prior Art 1, the amount of a transfer film produced on the counter member is small, and hence, not only are the sliding characteristics insufficient, but also is the counter member damaged when the counter member is a soft metal shaft.

Also, in Prior Art 2, a carbon fiber is contained as a filler in a proportion of 5 to 60% by weight in a resin composition for a sliding member, and hence, there is also such a technical problem that the sliding member damages the counter member.

In Prior Art 3, the sliding member is provided with good sliding characteristics in a high temperature zone; however, there is such a technical problem that the abrasion resistance at ordinary temperature is not sufficient.

SUMMARY OF THE INVENTION

In order to solve the above problems, this invention aims at providing a sliding member having so good sliding characteristics as not to damage the counter member composed of a soft metal over a range of from ordinary temperature to a high temperature zone.

Other objects and advantages of this invention will become apparent from the following description.

According to this invention, there is provided a sliding member obtained by molding a resin composition comprising an aromatic polyamide fiber, a PTFE, a lead oxide and at least one other heat resistant synthetic resin, the aromatic polyamide fiber being in a proportion of 10 to 30% by volume based on the total volume of the aromatic polyamide fiber, the PTFE, the lead oxide and the other heat resistant synthetic resin, the PTFE being in a proportion of 5 to 20% by volume based on the total volume, and the lead oxide being in a proportion of 0.1 to less than 5% by volume based on the total volume, and provided that the total of the aromatic polyamide fiber, the PTFE, the lead oxide and the other heat resistant synthetic resin equals to 100% by volume.

DETAILED DESCRIPTION OF THE INVENTION

As the heat resistant synthetic resin, a resin withstanding temperatures in the high temperature zone in which the sliding member is used is selected and used. In the case of a sliding member to be used at 200° C., polyethersulfone, polyetherketone, polyetherimide, polybenzoimidazole and the like which have particularly high heat resistance may be used. Also, in the case of a sliding member to be used at 150° C., polyphenylene sulfide (referred to hereinafter as PPS), polyetheretherketone (referred to hereinafter as PEEK), polyimide (referred to hereinafter as PI), polyamideimide (referred to hereinafter as PAI) and the like are particularly preferable.

The aromatic polyamide fiber to be added for improving the mechanical strength includes, for example, TECHNORA (trade name of TEIJIN LTD.), CONEX (a trade name of TEIJIN LTD.), KEVLAR (a trade name of DU PONT DE NEMOURS & COMPANY) and the like. The aromatic polyamide fiber is excellent in toughness and heat resistance and, when added to the resin, can also diminish the damage of the counter member. The aromatic polyamide fiber has preferably a length of 1 mm or less from the viewpoint of stability of sliding characteristics and injection molding.

The content of the aromatic polyamide is 10 to 30% by volume, preferably 15 to 25% by volume, based on the total volume of the resin composition. When the content is less than 10% by volume, the strength of the sliding member becomes insufficient, and when the content is more than 30% by volume, the sliding member sometimes damages a shaft composed of a soft metal and the injection-molding characteristic of the resin composition becomes low.

The PTFE includes commercially available ones such as TLP10F-1, TLP10 and MP1300 (these are trade names of DUPONT-MITUI FLUOROCHEMICALS CO., LTD.); LUBLON L-5 and LUBLON L-2 (these are trade names of DAIKIN INDUSTRIES, LTD.); KTL-500 (a trade name of Kitamura Co., Ltd.); and the like. In view of the stability of sliding characteristics, the PTFE preferably has an average particle size of 25 μm or less.

The content of PTFE is 5 to 20% by volume based on the total volume of the resin composition. When the content is less than 5% by volume, the effect of improving sliding characteristics is small, and when the content is more than 20% by volume, the strength of the sliding member becomes low. The content of PTFE is preferably 10 to 15% by volume in view of the relation between the sliding characteristics and the strength.

The lead oxide produces a transfer film to enhance the sliding characteristics. As the lead oxide, there may be used at least one member selected from the group consisting of lead monoxide, lead dioxide, dilead trioxide and trilead tetroxide. In particular, lead monoxide is preferable in view of the effect of improving sliding characteristics. The content of lead oxide is 0.1 to less than 5% by volume, preferably 0.1 to 4% by volume. When the content is less than 0.1% by volume, the effect of improving sliding characteristics is small and when the content is 5% or more by volume, the abrasion resistance at room temperature becomes low.

Moreover, at least one melt-moldable fluoroplastic is added in a proportion of 0.1 to 15% by volume of the total volume of the resin composition, whereby the abrasion resistance at room temperature can be increased. As the melt-moldable fluoroplastics, there may be used such as tetrafluoroethylene-perfluoroalkyl vinyl ether copolymers (referred to hereinafter as PFA), tetrafluoroethylene-hexafluoropropylene copolymer (referred to hereinafter as FEP), tetrafluoroethylene-ethylene copolymer (referred to hereinafter as ETFE) and the like. When the content of the melt-moldable fluoroplastics is less than 0.1% by volume, a sufficient addition effect is not obtained. When the content is more than 15% by volume, the friction coefficient becomes rather high.

As explained above, this invention is directed to a sliding member obtained by molding a resin composition comprising an aromatic polyamide fiber, a polytetrafluoroethylene, a lead oxide and a heat-resistant synthetic resin, and according to this invention, good sliding characteristics can be obtained without damaging the counter member composed of a soft metal over a range of from room temperature to a high temperature zone.

DESCRIPTION OF PREFERRED EMBODIMENTS

This invention is explained in more detail below referring to Examples and Comparative Examples. Examples 1 to 7 and Comparative Examples 1 to 5

The starting materials used in the Examples and Comparative Examples were as follows.

As PPS, RYTON P-4 (a trade name of PHILLIPS PETROLEUM COMPANY) was used.

As PEEK, 450G (a trade name of ICI) was used.

As PI, AURUM 450 (a trade name of Mitsui Toatsu Chemicals, Inc.) was used.

As PAI, TI-5013 (a trade name of TORAY INDUSTRIES, INC.) was used.

As the aromatic polyamide fiber, TECHNORA T-320 (a trade name of TEIJIN LTD.) was used.

As the lead oxide, lead monoxide (PbO) was used.

As the melt-moldable fluoroplastics, FEP was used.

These materials were mixed in the amounts shown in Table 1 and dry-blended by means of a Henschel mixer. Subsequently, the resulting mixture was subjected to melt-mixing in an extruder having an inner diameter of 40 mm to obtain compounded pellets having a diameter of 3 mm.

TABLE 1

| Starting materials | Example | | | | | | | Comparative Example | | | | |
|---|---|---|---|---|---|---|---|---|---|---|---|---|
| | 1 | 2 | 3 | 4 | 5 | 6 | 7 | 1 | 2 | 3 | 4 | 5 |
| PPS | 69 | 67 | — | — | — | 64 | 49 | 70 | 64 | 62 | 60 | — |
| PEEK | — | — | 67 | — | — | — | — | — | — | — | — | 70 |
| PI | — | — | — | 67 | — | — | — | — | — | — | — | — |
| PAI | — | — | — | — | 67 | — | — | — | — | — | — | — |
| Aromatic polyamide fiber | 20 | 15 | 15 | 15 | 15 | 20 | 25 | 20 | 15 | 15 | 15 | 20 |
| PTFE | 10 | 15 | 15 | 15 | 15 | 10 | 12 | 10 | 15 | 15 | 15 | 10 |
| PbO | 1 | 3 | 3 | 3 | 3 | 1 | 4 | — | 6 | 8 | 10 | — |
| FEP | — | — | — | — | — | 5 | 10 | — | — | — | — | — |

Unit: parts by volume

The pellets thus obtained were molded by an injection molding machine to prepare cylindrical bushes having an outer diameter of 26 mm, an inner diameter of 20 mm and a length of 20 mm to be used in the Examples and Comparative Examples. The bushes were tested by a bush-type testing machine. Incidentally, the conditions for the test by a bush-type testing machine tester were as shown in Table 2.

TABLE 2

| Testing machine | Bush-type testing machine |
|---|---|
| Sample dimension | φ26 × φ20 × 20 |
| Load | 1.96 MPa |
| Revolution speed | 1 m/min |
| Test time | 25 hours |
| Lubricant | Nothing |
| Temperature | Room temperature and 150° C. |
| Counter member | JIS-A5056 |

Also, after completion of the test, the degree of damage of the counter member was confirmed. The results thereof are shown in Table 3.

TABLE 3

| | | Example | | | | | | | Comparative Example | | | | |
|---|---|---|---|---|---|---|---|---|---|---|---|---|---|
| | | 1 | 2 | 3 | 4 | 5 | 6 | 7 | 1 | 2 | 3 | 4 | 5 |
| Room temperature | Friction coefficient | 0.14 | 0.17 | 0.14 | 0.17 | 0.16 | 0.15 | 0.14 | 0.38 | 0.22 | 0.20 | 0.19 | 0.25 |
| | Wear (μm) | 11 | 17 | 9 | 12 | 14 | 5 | 4 | 69 | 31 | 57 | 78 | 61 |
| | Damage of counter member | o | o | o | o | o | o | o | x | o | o | o | x |
| 150° C. | Friction coefficient | 0.10 | 0.13 | 0.12 | 0.15 | 0.14 | 0.13 | 0.12 | 0.32 | 0.15 | 0.16 | 0.13 | 0.20 |
| | Wear (μm) | 20 | 25 | 13 | 15 | 16 | 15 | 14 | 45 | 28 | 25 | 31 | 39 |
| | Damage of counter member | o | o | o | o | o | o | o | x | o | o | o | x |

As can be seen from the results shown in Table 3, the friction coefficient at room temperature was such that in Comparative Examples 1 and 5, somewhat high values such as 0.38 and 0.25 were shown as compared with Examples 1 to 7. However, the wears in Examples 1 to 7 were within the range of 4 to 17 μm which are all less than 20 μm. In particular, it was found that in Examples 6 and 7 in which FEP was added, the wears were remarkably small. On the other hand, it was found that in Comparative Examples 1 to 5, the wear resistance was not sufficient. In particular, in Comparative Examples 2, 3 and 4 in which the PbO content was 6, 8 and 10% by volume, respectively, it was found that the wear increased with an increase of the PbO content.

Moreover, the degree of damage of the counter member was observed with the naked eye to judge the case where scratches were indefinitely found in the counter member as x and the case where no scratches were found as o. As a result, in Comparative Examples 1 and 5 in which PbO was not contained, the counter member was damaged; however, in Examples 1 to 7 and Comparative Examples 2 to 4 in which PbO was added, no scratches were observed.

Also, at a high temperature of 150° C. in Examples 1 to 7 and Comparative Examples 2 to 4 in which PbO was contained, no great difference was found in respect of friction coefficient and the degree of damage of counter member. In addition, the wears in Examples 1 to 7 were slightly lower than in Comparative Examples 2 to 4. Sliding characteristics in Examples 1 to 7 at a high temperature were excellent.

Incidentally, Examples 2 to 5 are examples in which PPS, PEEK, PI or PAI was used as a heat resistant resin; however, no great influence of the heat resistant resin was observed and it was found that any of the heat resistant resins could be used.

What is claimed is:

1. A sliding member obtained by molding a resin composition comprising an aromatic polyamide fiber, a polytetrafluoroethylene, lead monoxide and at least one other heat resistant synthetic resin, the aromatic polyamide fiber being in a proportion of 10 to 30% by volume based on the total volume of the aromatic polyamide fiber, the polytetrafluoroethylene, the lead monoxide and the other heat resistant synthetic resin, the polytetrafluoroethylene being in a proportion of 5 to 20% by volume based on the total volume, and the lead monoxide being in a proportion of 0.1 to 4% by volume based on the total volume.

2. The sliding member according to claim 1, wherein said at least one other heat resistant synthetic resin is selected from the group consisting of polyphenylene sulfides, polyetheretherketones, polyimides and polyamideimides.

3. The sliding member according to claim 1, wherein the polytetrafluoroethylene is in the form of particles having an average particle size of 25 μm or less.

4. The sliding member according to claim 1, which further comprises at least one melt moldable fluoroplastic in a proportion of 0.1 to 15% by volume of the total volume of the resin composition.

5. The sliding member according to claim 3, which further comprises at least one melt moldable fluoroplastic in a proportion of 0.1 to 15% by volume of the total volume of the resin composition.

6. The sliding member according to claim 2, wherein the polytetrafluoroethylene is in the form of particles having an average particle size of 25 μm or less.

7. The sliding member according to claim 6, which further comprises at least one melt moldable fluoroplastic in a proportion of 0.1 to 15% by volume of the total volume of the resin composition.

8. The sliding member according to claim 1, wherein said proportion of said aromatic polyamide fiber is 15–25% by volume.

9. The sliding member according to claim 1, wherein said proportion of polytetrafluoroethylene is 10–15% by volume.

10. The sliding member according to claim 1, wherein the total of the aromatic polyamide fiber, the polytetrafluoroethylene, the lead monoxide and the other heat resistant synthetic resin equals 100% by volume.

11. The sliding member according to claim 3, wherein said at least one other heat resistant synthetic resin is selected from the group consisting of polyphenylene sulfides, polyetheretherketones, polyimides and polyamideimides.

12. The sliding member according to claim 3, wherein said proportion of said aromatic polyamide fiber is 15–25% by volume.

13. The sliding member according to claim 12, wherein said proportion of polytetrafluoroethylene is 10–15% by volume.

14. The sliding member according to claim 3, wherein said proportion of polytetrafluoroethylene is 10–15% by volume.

* * * * *